United States Patent
De Angelis

(10) Patent No.: US 9,139,371 B2
(45) Date of Patent: Sep. 22, 2015

(54) SPIRAL CONVEYOR

(75) Inventor: Marco De Angelis, Zurich (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 123 days.

(21) Appl. No.: 13/698,121

(22) PCT Filed: Jun. 10, 2011

(86) PCT No.: PCT/CH2011/000141
§ 371 (c)(1),
(2), (4) Date: Feb. 7, 2013

(87) PCT Pub. No.: WO2011/156927
PCT Pub. Date: Dec. 22, 2011

(65) Prior Publication Data
US 2013/0153369 A1  Jun. 20, 2013

(30) Foreign Application Priority Data

Jun. 17, 2010 (CH) .................................. 978/10

(51) Int. Cl.
*B65G 21/18* (2006.01)
*B65G 21/20* (2006.01)
*B65G 39/18* (2006.01)

(52) U.S. Cl.
CPC ............ *B65G 21/18* (2013.01); *B65G 21/2054* (2013.01); *B65G 39/18* (2013.01); *Y10T 29/4984* (2015.01)

(58) Field of Classification Search
CPC .... B65G 2207/24; B65G 21/18; B65G 17/24; B65G 39/18; B65G 21/2054

USPC ................................................... 198/778, 779
See application file for complete search history.

(56) References Cited

U.S. PATENT DOCUMENTS

| | | | | |
|---|---|---|---|---|
| 4,194,616 A * | 3/1980 | Barthelemy et al. | ........... | 198/778 |
| 4,934,517 A * | 6/1990 | Lapeyre | ......................... | 198/852 |
| 5,306,212 A | 4/1994 | Eberle | | |
| 6,006,898 A * | 12/1999 | Odink | ........................... | 198/853 |
| 6,725,998 B2 * | 4/2004 | Steeber et al. | ............. | 198/347.4 |
| 6,796,418 B1 * | 9/2004 | Harrison et al. | ............... | 198/778 |
| 7,870,948 B2 * | 1/2011 | Reist | ............................ | 198/779 |

(Continued)

FOREIGN PATENT DOCUMENTS

| | | | | |
|---|---|---|---|---|
| CH | WO 2009/036580 | * | 3/2009 | ............. B65G 21/20 |
| CH | WO 2009/036581 | * | 3/2009 | ............. B65G 21/20 |
| DE | 3726059 | | 12/1988 | |

(Continued)

*Primary Examiner* — Gene Crawford
*Assistant Examiner* — Thomas Randazzo
(74) *Attorney, Agent, or Firm* — Rankin, Hill & Clark LLP

(57) ABSTRACT

A spiral conveyor has a conveying device that is moved along a helically running spiral region. The conveying device is supported along the spiral region on the radially loaded side of the conveying device. The support is realized by multiple individual deflecting devices that lie along the radially loaded side of the conveying device. Each said deflecting device has a central body including a roller body that surrounds the central body, the roller body including a plurality of rollers. The rollers are rolled on a roller track of the central body in an annular segment of a helically running supporting region of the spiral conveyor.

17 Claims, 13 Drawing Sheets

(56) References Cited

U.S. PATENT DOCUMENTS

| | | | |
|---|---|---|---|
| 8,162,132 B2 * | 4/2012 | Muller | 198/779 |
| 8,302,764 B2 * | 11/2012 | Johnson | 198/778 |
| 8,348,048 B2 * | 1/2013 | DeAngelis et al. | 198/779 |
| 2010/0038212 A1 * | 2/2010 | Seger et al. | 198/778 |

FOREIGN PATENT DOCUMENTS

| | | |
|---|---|---|
| DE | 10135659 | 2/2003 |
| EP | 1340698 | 9/2003 |
| EP | 2154089 | 2/2010 |
| WO | 2009/036580 | 3/2009 |

* cited by examiner

SPIRAL CONVEYOR

BACKGROUND OF THE INVENTION

1. Field of the Invention

The invention relates to the area of materials handling technology. It relates, in particular, to a spiral conveyor as well as to a deflecting device as claimed in the preamble of the corresponding independent claims.

2. Description of Related Art

Piece goods or bulk goods can be conveyed in conveying systems by way of belts or flush-grid chains. Spiral conveyors are used in order to overcome vertical distances, or to realize storage sections, buffer sections or delaying sections in the conveying system. However, large frictional losses occur in spiral conveyors, or in general in the case of the deflecting of pulled conveyor belts, in particular in resilient belts per se, curve-going flush-grid chains, link chains, plate chains and flat-top chains (referred to below collectively as conveying means). Consequently, it is deemed not to be possible to pull such conveyor belts or rather conveyor chains about an angle of deflection in excess of 180°. Consequently, drives of spiral conveyors are developed such that driving forces are introduced at several positions along the angle of deflection. To reduce frictional forces, it is known, for example from WO 99/35063, to arrange fixedly mounted rollers in a deflecting region.

WO 2009/036580A1 discloses a deflecting device as an independent structural unit which is installable in a conveying system as an independent structural unit for deflecting or for supporting in the case of a directional change of a conveying means. In this case, a roller body with several rollers rolls around a central body of the deflecting device. For use in the case of deflection around variously large angles, it is provided that the central body is assembled from several sector elements in modular construction, and a correspondingly shorter or longer roller body is then arranged around the central body. As an alternative to this, to realize different angles of deflection, the central body can be formed from a flexible material. When used in spiral conveyors, it is provided that the roller body ascends along a spiral lengthways of a conveyor belt and is subsequently returned again.

WO 2009/036581 A1 also describes a deflecting device, the form of the central body being adjustable in order to realize various radii of curvature or various angles of deflection.

BRIEF SUMMARY OF THE INVENTION

It is the object of the invention to create an improved spiral conveyor with a deflecting device for a conveying system of the aforementioned type which eliminates the abovementioned disadvantages, as well as a deflecting device which is suitable for use in a spiral conveyor and is simple to produce.

Said object is achieved by a spiral conveyor and a deflecting device as claimed in the corresponding independent claims.

The spiral conveyor as claimed in the invention therefore comprises a conveying means which is conveyed along a spiral region which extends in a screw-like manner (for example along a helix), the conveying means being supported on its inside laterally, in the radial direction of the spiral, along the spiral region. In this case, said supporting is realized by several individual deflecting devices which are arranged along the radially loaded side of the conveying means, wherein said deflecting devices each comprise a central body with a roller body circulating around said central body with a plurality of rollers, and the rollers roll along a roller track of the central body in an angular segment of a helically extending support region of the spiral conveyor. A circular track of the rollers around the central body, in this case, is preferably closed and comprises a variation (along the circular track) of the curvature.

In a first preferred embodiment of the invention, the individual deflecting devices are arranged one after the other along the inside of the conveying means. The inside of the conveying means is that side which is facing the inside or the central axis of the spiral region. This is the radially loaded side when the conveying means is pulled around the spiral. Deflecting devices can also be arranged in reverse along the outside of the spiral region. This is the radially loaded side when the conveying means is pushed.

In an astonishing manner, large angles of deflection can be realized with the conveying means supported in this manner. Contrary to the current view, angles of deflection around a complete convolution, that is to say of 360° or more, are able to be realized, the conveying means being pulled through the spiral region simply by a drive, or, in another preferred embodiment of the invention, being pushed, or being moved back and forth. No drive which cooperates with the conveying means in further regions of the spiral region is, therefore, preferably necessary. This means that angles of deflection around two, three or more convolutions are also realizable.

In a preferred embodiment of the invention, the central body is flexible and preferably elastic. As a result, it can be produced in a planar form and be provided with the roller body. The track of the roller body around the central body, when producing the deflecting device, therefore also extends in one plane. During assembly, the deflecting device can be elastically deformed, in particular twisted, into the desired form along the helical line of the spiral. It then remains fastened to the spiral conveyor in this manner in the deformed state. The central bodies of the deflecting devices are therefore twisted in the spiral conveyor. During disassembly, an elastic deflecting device will spring back again into the original planar form. This means that the deflecting devices are simple to produce and simple to use; no complicated helical forms—adapted to the precise form of the respective spiral conveyor—have to be calculated and produced for the central body. A flexible central body of this type can also be used independently of a spiral conveyor.

In another preferred embodiment of the invention, it is provided that the deflecting devices are not twisted. Said deflecting devices, however, are also are arranged one after the other following the course of the conveying means in a helical manner.

The form of an individual deflecting device is defined substantially by the form of the central body, and corresponds to a freely selectable angle of deflection. The angle of deflection, for example, is between 20 degrees and 200 degrees. To form modules of a spiral conveyor, the angle of deflection is preferably 45°, 60° or 90°. Along said angle of deflection, or, in other words, in a rolling region, the conveying means is supported by the roller body of the deflecting device, or rather the conveying means rolls along the roller body. The return of the roller body preferably extends along the shortest path outside of the rolling region, or, however, in a track that is curved and approximately parallel with the rolling region.

The detailed design of a deflecting device is developed in a preferred embodiment of the invention just as in previously quoted WO 2009/036580 A1 or WO 2009/036581 A1, which are hereby incorporated by reference into the present application in their entirety.

In a preferred embodiment of the invention, the rollers are guided and spaced apart from each other by way of a means for maintaining the distance between rollers, in particular in a roller band.

The roller band is preferably produced from a flexible flat material, in particular from a woven belt or a woven fabric interspersed with plastics material. Further preferred usable embodiments of roller bands are disclosed in WO 2006/094423, in particular in FIGS. 8 to 18 and the corresponding sections of the description, the contents of which is hereby adopted by reference in its totality. For example, a roller band can also comprise a constriction between the supports of the rollers, preferably in the center, such that the roller band is also bendable about an axis that is perpendicular to the plane of the roller band.

In a preferred embodiment of the invention, the roller band extends by way of its two outer edges in a conveyor guiding groove of the central body and as a result is guided and prevented from falling out. The conveyor guiding groove is preferably formed in part of the central body and, in principle, forms a slot which circulates around the central body, the roller body, however, being able to extend freely in individual regions of the circular track, that is to say not in the conveyor guiding groove.

In further preferred embodiments of the invention, the roller body is formed from a plurality of individual rollers which are not chained to each other. The rollers are arranged so as to roll around the central body and can be spaced apart from each other by means of spacer bodies. Such spacer bodies are mounted so as to be rotatable along the axes of the rollers, preferably at both ends of the rollers, next to a rolling part of the rollers, and prevent the rotating rollers from contacting each other.

The invention allows for the use of improved and simplified spiral conveyors by the drive or rather the introduction of force for moving the conveying means being considerably simplified; one single drive motor can pull or push the conveying means upward or downward around one or several rotations, or can move it back and forth. Applications are, for example, vertical conveyors for overcoming vertical distances in which a helix climbs up in spirals (or vice versa) from one conveying plane to another conveying plane. Other applications are storage sections or buffer sections or delaying sections in the conveying system. The geometric arrangement of spirals of the spiral conveyor also includes, together with a simple spiral (screw), screws of different diameters arranged inside one another, a double helix and screws arranged side by side. Such a screw or spiral can also have a radius that varies along the track of the conveying means, corresponding to a spiral, and/or a varying pitch. In a storage section or buffer section, for example, the conveying means is guided with the conveyed product first of all upward in a spiral and in another spiral downward. This can also occur repeatedly by means of several spirals. In addition, in a storage section there can be a return deflection which deflects the conveyed product out of the storage means onto the return path before the position of the return deflection in the storage means is adjustable, as a result of which, therefore, the length and the capacity of the storage means, and consequently also the dwell time of the conveyed product in the storage means, can be varied. In a quite general manner, a storage means can be realized as "first in—first out" or as "first in—last out".

A deflecting device, which is suitable, in particular, for use in a spiral conveyor, but can also be used for other applications with no reference to spiral conveyors, is formed by plastically deforming a preferably metallic profiled rod. The profiled rod comprises a cross sectional profile that remains substantially the same over its length, which however does not exclude, for example, fastening holes or slots being able to be present at different positions of the rod. The profile can, when seen in cross section, be open or closed. Even after the deforming of the rod, the cross sectional profile, when seen along the deformed rod, remains substantially the same.

The entire central body can be formed from such a profiled rod, or only a part profile, a second part profile consisting of another material, for example plastics material. Other materials from which the entire profile or a part profile can be produced, along with metals and plastics materials, are also composite materials (e.g. glass fiber or carbon fiber based), ceramic materials, timber, bamboo, etc and combinations of the same.

The part profiles can be connected together without separate further parts as connecting elements, for example by means of snap-type connections, toothing, soldering, welding and shrinking-on. As an alternative to this, there can be separate connecting elements for connecting the profiles, for example pins, screws, brackets and adhesive etc. Part profiles can be joined together and then deformed together, or however firstly deformed individually and only then joined together.

To produce a toothed deflecting device, the profiles are pushed into one another and deformed together, in particular curved and/or twisted. In general, when the part profiles are deformed together, the ends of the central body formed in this manner are preferably cut cleanly to length and provided with deflecting elements or end elements which guide the rollers from an advancing track onto a returning track and vice versa. The profile or the part profiles can consequently be produced quasi-endlessly by means of continuous casting methods or plastics material extrusion methods. During production of a deflecting device with specific predetermined dimensions (length, curvature), this can occur in a simple manner, proceeding in each case from the same straight standard profiles. No production of complicated special geometries is necessary and no such parts with different lengths and radii have to be stored.

In a preferred embodiment of the invention, the deflecting device comprises a first region with a constant curvature, and transition regions connecting thereto on both sides. In each case, when seen from the ends of the deflecting device, the curvature of the deflecting device or rather of the central body in the transition regions increases constantly from zero as far as up to the curvature of the first region. Consequently, it is now possible in a jolt-free manner to move the conveying means into the curve of a spiral or in general of a deflection inside the plane.

In a further preferred embodiment of the invention, there is a protecting means which circulates around the central body outside of the roller body and which, in the region of a front roller track, where the conveying means is supported, extends between the conveying means and the rollers. The protecting means is, for example, a flexible belt or a link chain. The protecting means can additionally be formed corresponding to the form of the conveying means, for example with a cutout corresponding to the thickness of the conveying means. As a result, it operates as an adapting element: with it a deflecting device can be adapted to a form of a different conveying means by different adapting elements being used without the rest of the deflecting device having to be adapted.

In summary, the deflecting device is, therefore, preferably elastically deformable as a whole such that flat deflecting devices can be adapted to a spiral form or to another non-flat form, and the central body is plastically deformable such that deflecting devices can be produced in a simple manner from standard profiles.

As claimed in further preferred embodiments of the invention, there is a drive means which extends along the spiral and between the conveying means and the roller body and which transmits a driving force onto the conveying means. The drive means is, for example, a drive belt.

In a preferred embodiment of the invention, the drive means comprises a first toothing, which engages in a second toothing of the conveying means in the spiral region, that is to say in a region in which the drive means follows a helical line of the spiral, and as a result transmits the driving force.

In a preferred embodiment of the invention, the drive means is returned outside a helical portion of the spiral, in which it transmits the driving force to the conveying means, by means of a return section of the drive means which does not extend along the helical line of the spiral. The return section preferably does not extend along a return section of the conveying means either. Said return section can extend in a substantially straight manner, preferably approximately along the direction of the axis of the spiral or rather of the helical line. The section of the spiral, along which the drive means transmits the driving force to the conveying means, preferably includes in excess of 270° or 360°.

In a further preferred embodiment of the invention, the drive means is driven at one or several positions of the spiral region along the helical line of the spiral by a device for introducing force. For example, for this purpose it wraps around a means for introducing force, typically a wheel or a toothed wheel.

In a further preferred embodiment of the invention, the drive means and the conveying means are both driven, either by separate drives or by the same drive.

According to one further aspect of the invention, there is no plurality of individual deflecting devices present, but one roller body which extends in a guide rail along the helical line of the spiral. Said roller body is preferably formed by a roller belt with rollers. The roller body extends, for example, along the entire spiral or along a section of the spiral of in excess of 270° or 360°. The roller body guides and transports the rollers along the guide rail, the conveying means rolling on the rollers.

As a result, the overall length of the roller body or rather of roller bands is shortened and the structure of the deflecting devices simplified, i.e. they can be replaced, for example, by one single guide rail extending along the inside of the spiral. In addition, there are no gaps present in the support as those between the deflecting devices.

Said further aspect of the invention can be realized without the features of the previously described embodiments, and consequently can be described as: A spiral conveyor, comprising a conveying means moved along a helically extending spiral region, wherein the conveying means is supported on its radially loaded side along the spiral region, and wherein said support is realized by a guide element, for example a guide rail, arranged along the radially loaded side of the conveying means. To this end, the spiral conveyor comprises a roller body moved along the guide element with a plurality of rollers, wherein said rollers roll, on the one hand, on the guide element and, on the other hand, on the conveying means or on an adapting element which is arranged between the conveying means and the rollers and is entrained with the conveying means in the region of the spiral.

In a preferred embodiment of said further aspect of the invention, the roller body is returned outside a helical section of the spiral, in which it supports the conveying means, by means of a return section of the roller body which does not extend along and/or not substantially parallel to and/or not concentric with respect to the helical line of the spiral. Said return section can extend in a substantially straight manner, preferably approximately along the direction of the axis of the spiral. In a transition from the section of the spiral to the return section, the roller body is initially guided away from the spiral and is then guided in a direction substantially perpendicular to the conveying surface of the conveying means.

In further embodiments of said further aspect of the invention, a spiral conveyor comprises both a roller body and a drive means or drive belt, which are not returned along the helical line of the spiral. In the case of said return, the drive means and the roller body can be guided together, i.e. side by side or in parallel, or not together. The different embodiments with an adapting element as drive means, in particular a drive belt, can also be combined herewith.

Further preferred embodiments proceed from the dependent claims. In this case, features of the method claims can be combined analogously with the device claims and vice versa.

BRIEF DESCRIPTION OF THE DRAWINGS

The object of the invention is explained below in more detail by way of preferred exemplary embodiments which are shown in the accompanying drawings, in which.

The references used in the drawings and the meaning thereof are listed together in the list of references. In principle, identical parts are provided with identical references in the figures.

DETAILED DESCRIPTION OF THE INVENTION

Figure 1:
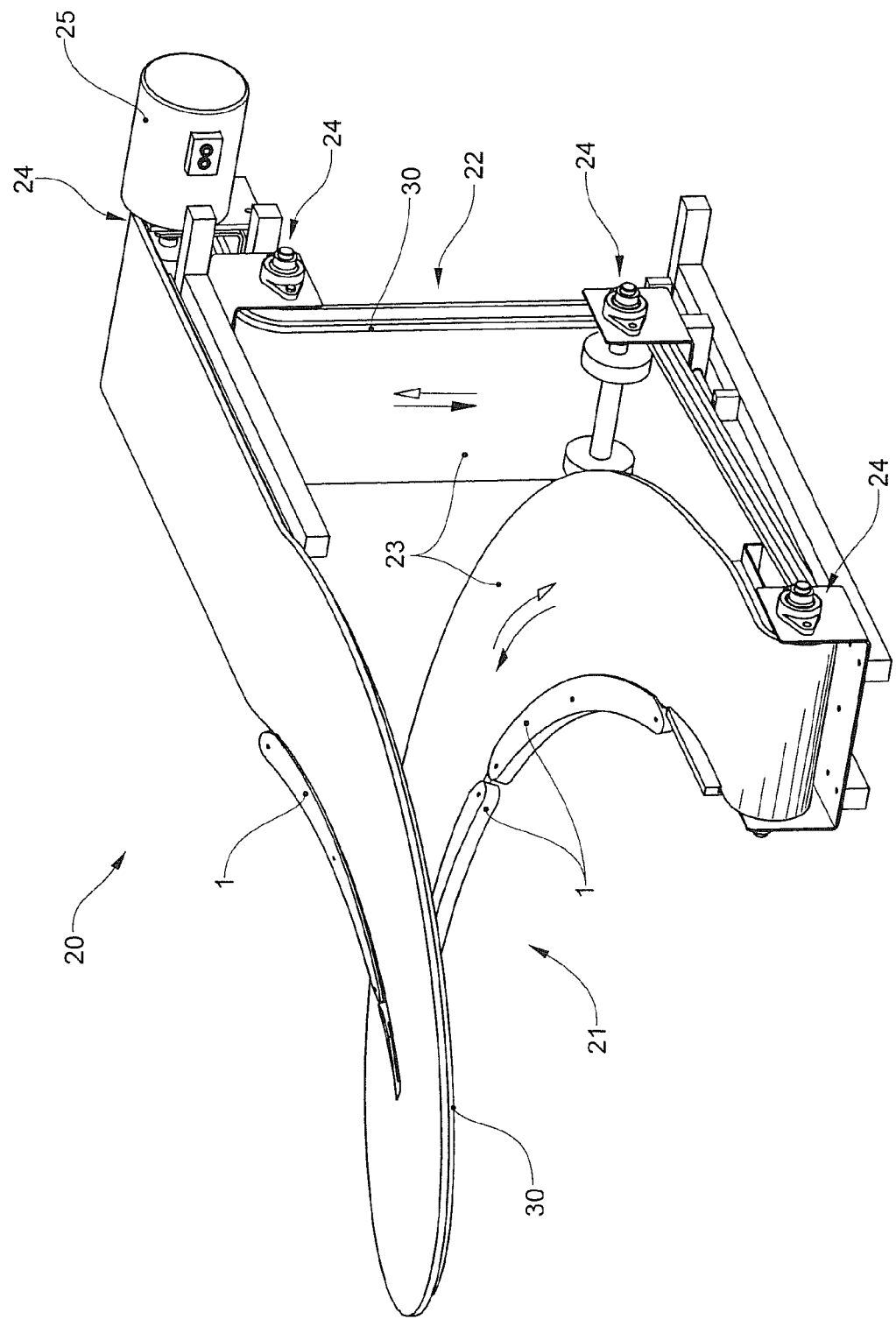
FIG. 1 shows a schematic representation of a spiral conveyor.

FIG. 1 shows a spiral conveyor 20. It shows an endlessly circulating conveying means 23, for example a conveying chain such as a flush-grid chain, link chain, plate chain or a flat-top chain, arranged conveying along a spiral region 21. The spiral region 21 guides the conveying means 23 out of a datum plane into a plane located higher up, from where it is guided downward again by means of a vertically extending return region 22 into the datum plane and finally back to the start of the spiral region 21. In this case, the conveying means 23 is deflected at several positions by means of vertical deflections 24. Said deflections each have an axis of deflection which extends in a substantially perpendicular manner with respect to an axis of the spiral region 21 and in a perpendicular manner with respect to the conveying direction of the conveying means 23 in the region of the respective vertical deflection 24. The conveying means 23 is pulled through the spiral region 21 by means of a drive 25 in the upper region of the spiral region 21. In an alternative embodiment of the invention, the drive 25 is arranged in the lower region or several drives are present. The spiral conveyor 20 also comprises support or frame elements which are, however, not shown. The conveying means 23 is supported in the vertical direction in the region of the deflection devices 1 preferably by these themselves, and in other regions by slide rails 30 as further guide means. These are expedient, in particular, in regions which are situated opposite the deflection device 1 with reference to the conveying means 23, by preventing, for example, the conveying means 23 lifting up at the outer periphery of the spiral.

To support the conveying means 23 laterally or radially in the spiral region 21, several deflecting devices 1 are arranged. Said deflecting devices as modular elements and separate structural and assembly units can be assembled, disassembled and transported as one unit. They form, arranged connecting side by side, a helically extending radial support. The term "radial" is to be understood with reference to the spiral form or rather the screw form, that is to say substantially intersecting the axis of the spiral and extending perpendicular to the axis of the spiral.

The vertical support of the conveying means 23 in the spiral region 21 just as also in the other regions can occur by means of slide rails or equally by means of support elements with circulating rollers. A vertical support can be set up for the purpose, amongst other things, of holding the conveying means 23 against an upward movement, produced, for example, by means of the pull of the drive.

Figure 2:
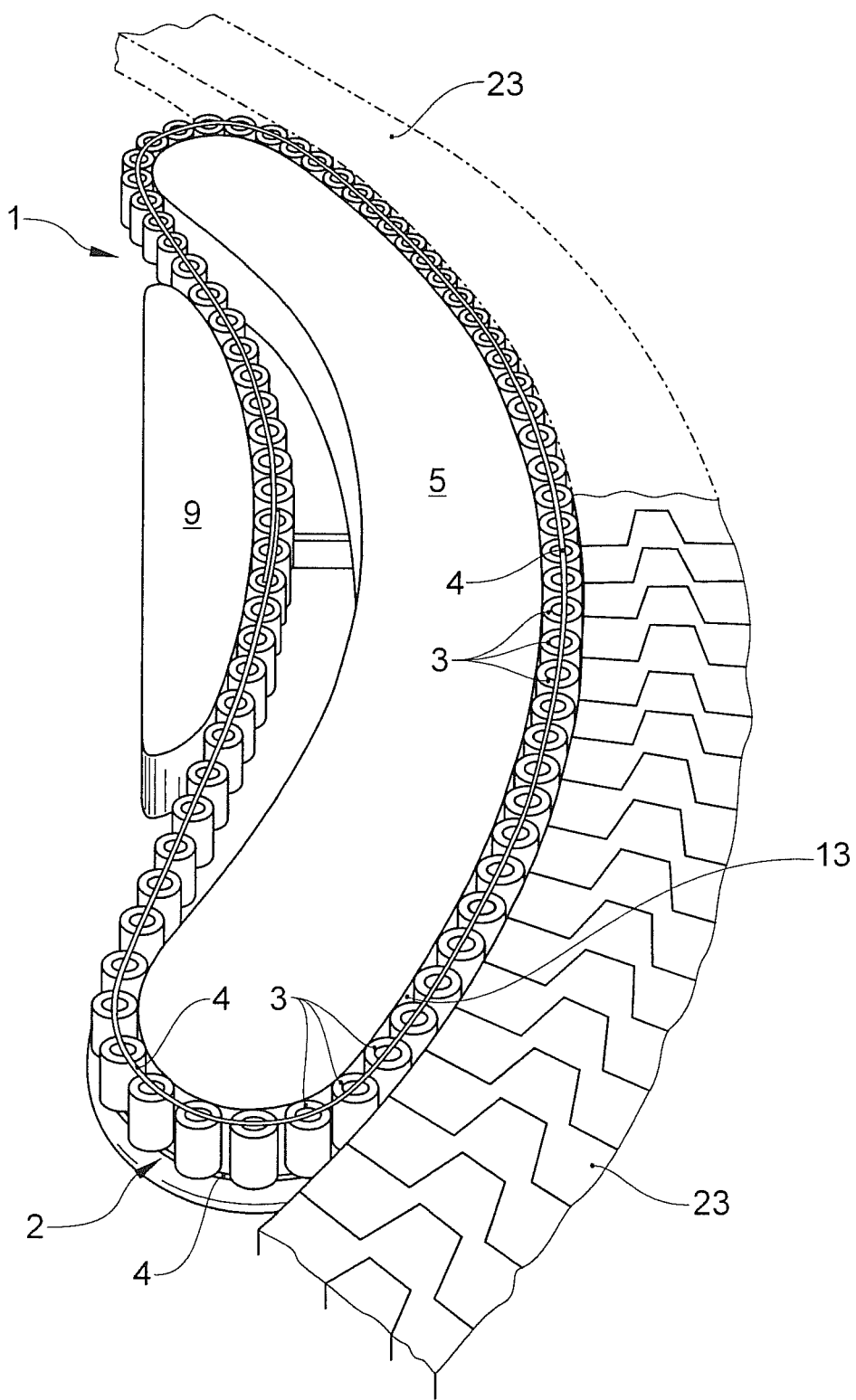
FIGS. 2 and 3 show a schematic representation of views of a deflecting device for a conveying means.
Figure 3:
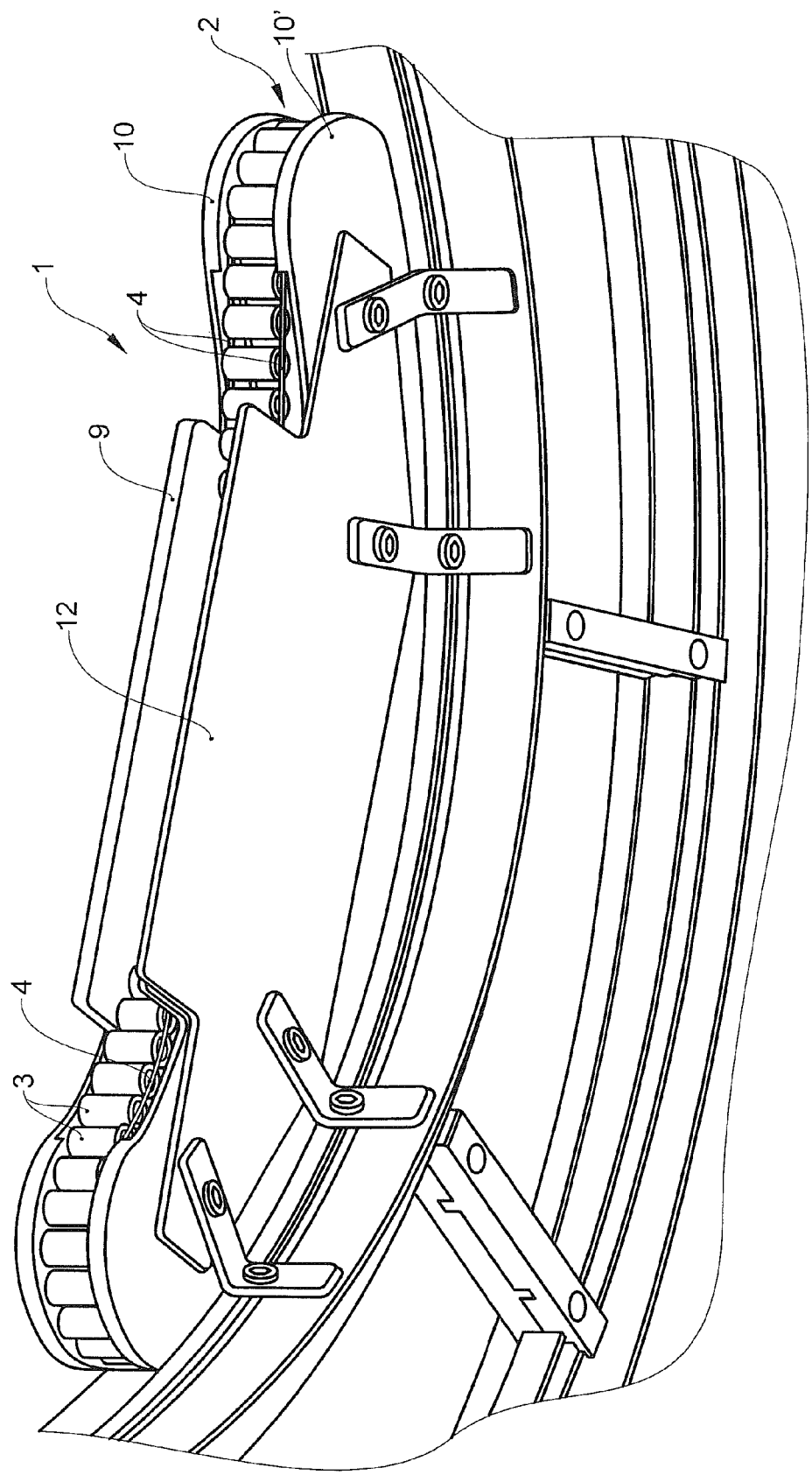

FIGS. 2 and 3 show views of a deflecting device 1 for a conveying means 23. The deflecting device 1 comprises a central body 5, a roller body 2 being arranged circulating around said central body. The roller body 2 extends in a rolling region between the central body 5 and the conveying means 23 and, in the case of a movement of the conveying means 23, rolls along a roller track 13 of the central body 5. In this case, the roller body transmits 2 pressure forces by way of its rollers 3 perpendicular to the roller track 13. As a result, the forces which are necessary for changing the direction of the conveying means 23 are absorbed with minimum friction. The individual rollers 3 are mounted in a circulating means for maintaining the distance between rollers, in this case a roller belt 4, such as described, for example, in WO 2009/036580A1. The roller belt 4 is only shown schematically in FIG. 2 by its top and bottom surface. The guiding of the roller belt 4, or in general of the rollers 3, is realized by means of circulating conveyor guide grooves 11 in the central body 5, in particular in each case in a top and the bottom conveyor guide body 10, 10', as are described below.

Figure 4:
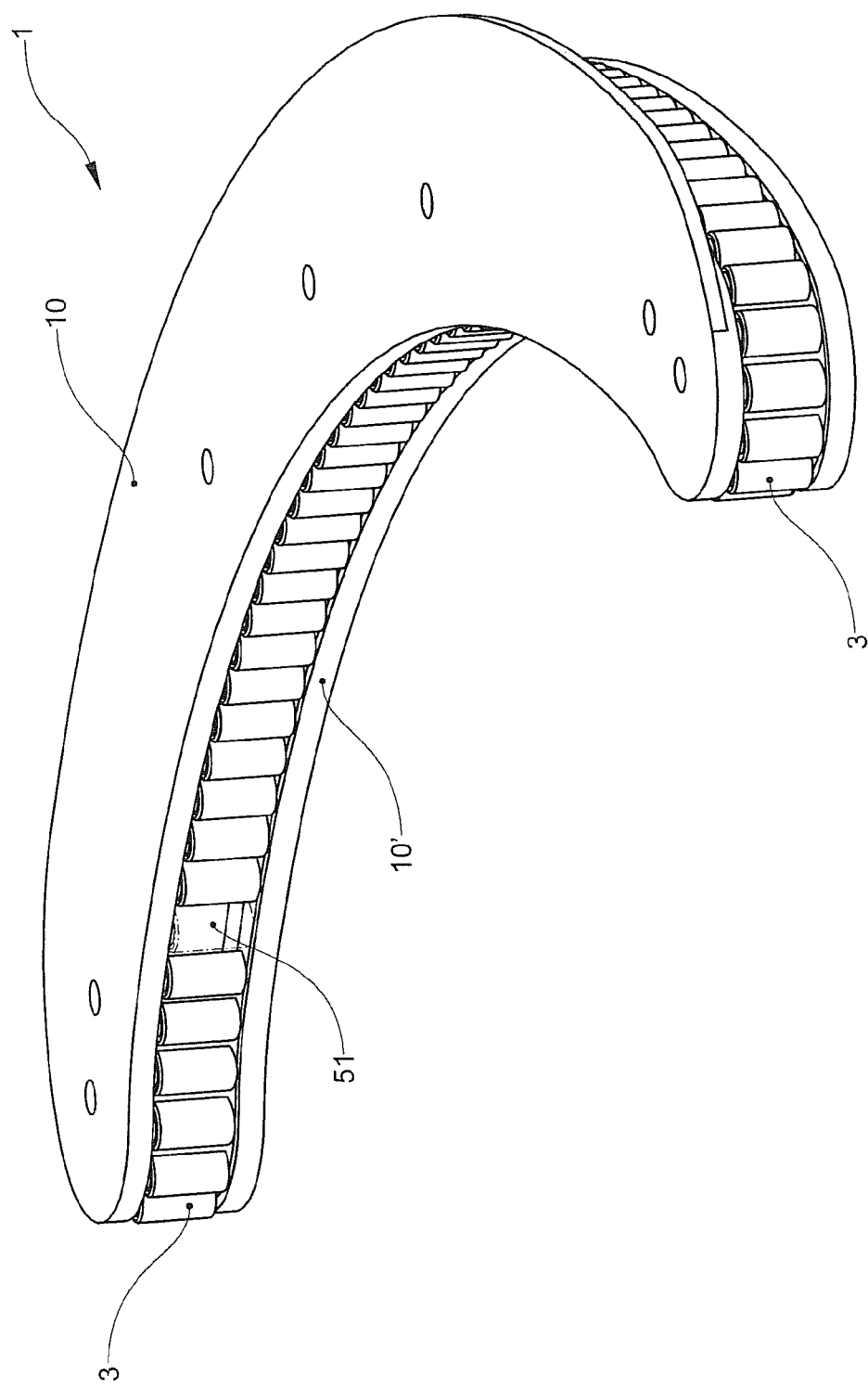
FIGS. 4 to 6 show a schematic representation of a preferred embodiment of a deflecting device.
Figure 5:
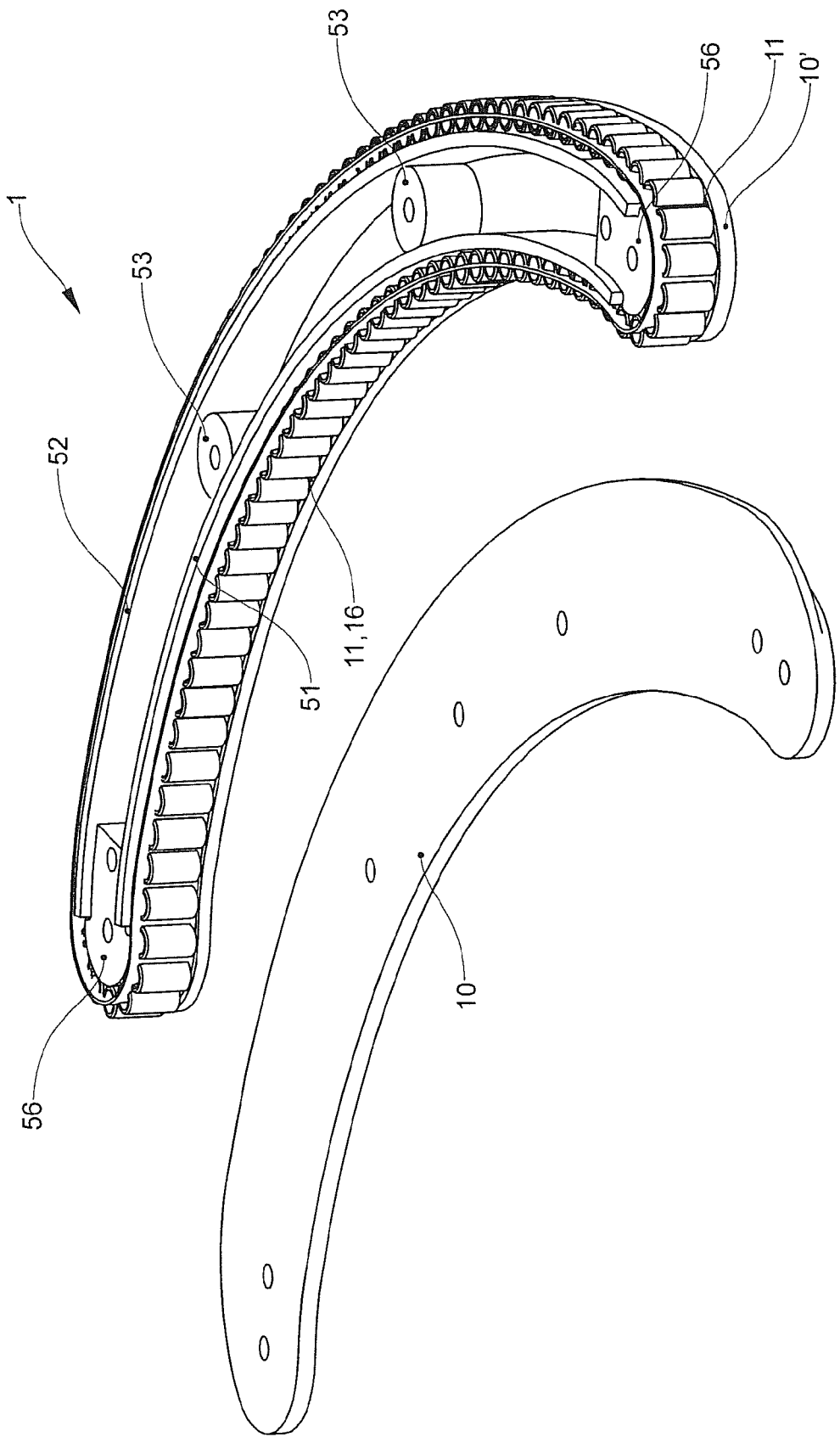
Figure 6:
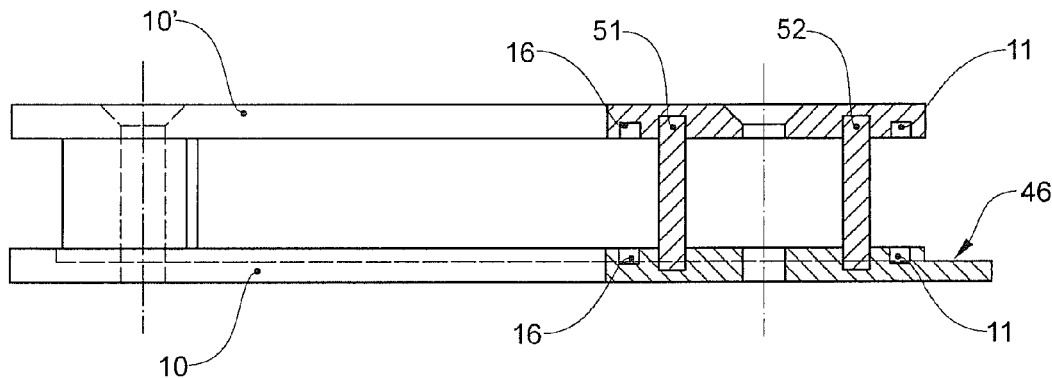
Figure 7:
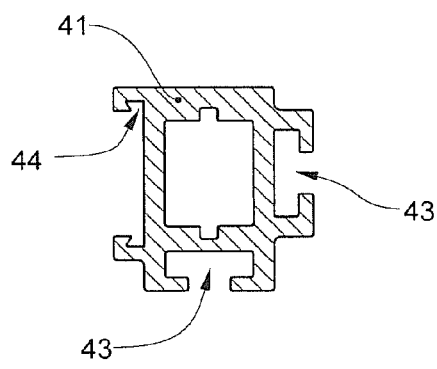
FIGS. 7 to 11 show a schematic representation of a further preferred embodiment of a deflecting device.

FIGS. 4 and 5 show views of a deflecting device 1 in a further preferred embodiment of the invention. FIG. 6 shows a corresponding cross section. In FIG. 4, the deflecting device 1 is assembled, one of the rollers 3 being shown transparently in order to show an inner track element 51. In FIG. 5 a top part of the central body 5 has been removed. The central body 5 is formed in several parts by a top and a bottom conveyor guide body 10, 10' (as 'cover' and 'base'), as well as by a curved inner track element 51 and a curved outer track element 52 and two end elements 56 which are held together by the conveyor guide body 10, 10'. The rollers 3 of the roller body 2 roll, moving around the central body 5, on the two track elements 51, 52 and at the transition between the track elements 51, 52 on the end elements 56. It is also possible to arrange spacer elements 53, which define the distance between the conveyor guide bodies 10, 10', between the inner and outer track elements 51, 52. Preferably, the central body 5 comprises cavities between the named elements, and the elements from which the central body 5 is assembled are flexible such that the central body 5 also is flexible as a whole, and in particular is resiliently movable, and in particular also twistable.

For assembly in a spiral conveyor 20, the flexible deflecting devices 1 are each brought into the necessary form and are fixed in said form by means of fastening to the support or frame elements of the spiral conveyor 20.

FIGS. 7 to 11 show a further preferred embodiment of a deflecting device 1. Here, the central body 5 is formed from two interconnected profiles or part profiles 41, 42:
  a first part profile 41 (shown in its own in FIG. 7), for example of metal, in particular light metal or a light metal alloy, on which are realized a return roller track 15 and a return conveyor guide 16 as well as fastening profiles 43; and
  a second part profile 42, for example of plastics material or equally of metal, on which are realized the front conveyor track 14 and the conveyor guide groove 11 for the front region of the circular track of the rollers 3. A conveying means guide 46 envelops a conveying means 23 pushing against the rollers 3 and supports it in a sliding manner.

Figure 8:
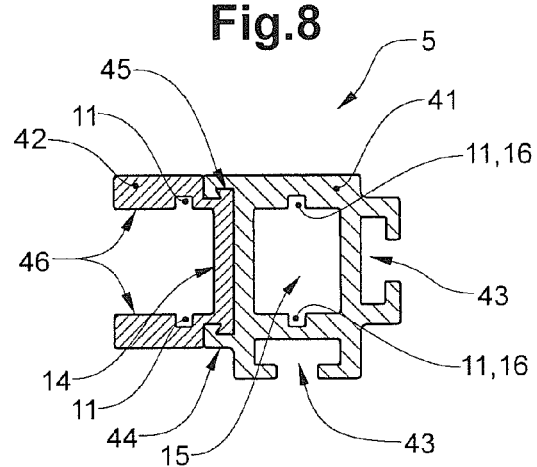

The two part profiles 41, 42 are pushed into each other or snapped into each other, as a result of which a connecting profile 44 of the first part profile 41 is hooked or interlocked with a complementary connecting profile 45 of the second part profile 42 (FIG. 8). The part profiles are preferably formed by means of a continuous casting or extrusion method.

Figure 9:
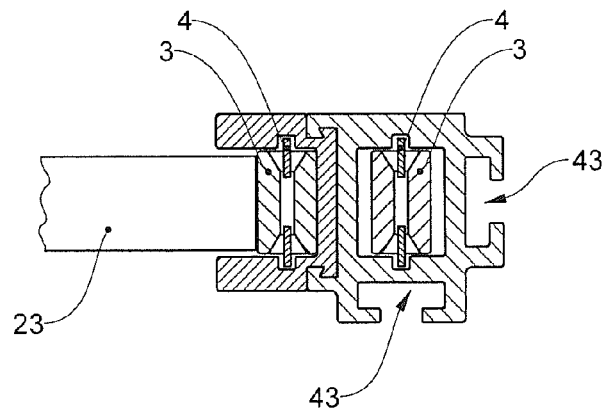

FIG. 9 shows a cross section of the central body 5 with the roller belt 4 inserted with the rollers 3 and with part of a conveying means 23 which is supported against the rollers 3 in the radial direction and by the conveying means guide 46 in the vertical direction. The rollers 3 therefore operate as rolling bodies between the conveying means 23 and the front conveyor track 14. The rollers 3 are guided relatively loosely, with play, in the return conveyor track 15. The inside width of the return conveyor track 15 is therefore larger than the rollers 3, but in height in particular is not so large that the rollers 3 are able to tilt and thereby jam.

Figure 10:
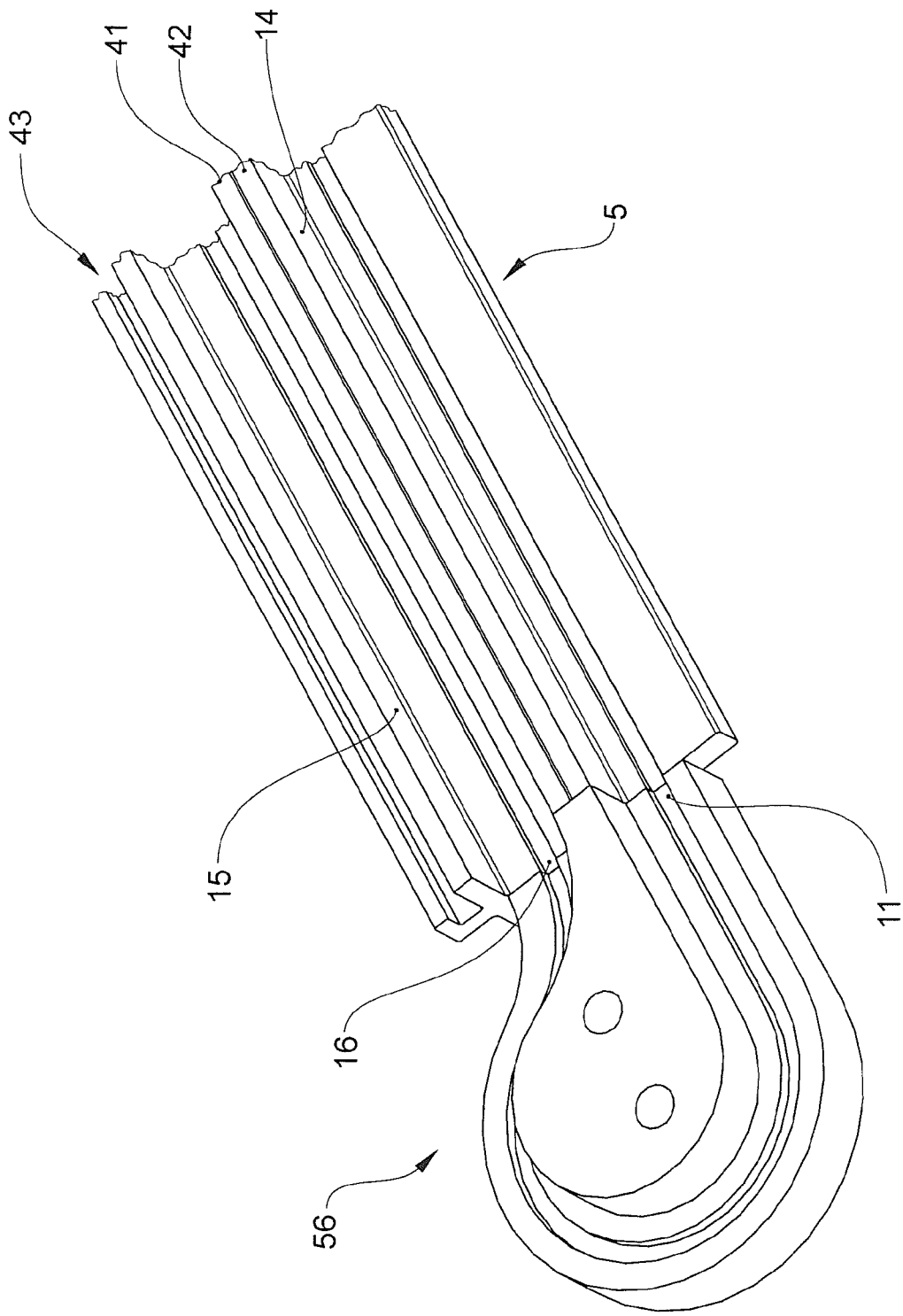

An end element 56, which itself can be constructed in multiple parts, is placed in each case at an end of the central body 5 and forms a guide for the circular track of the front conveyor track 14 to the return conveyor track 15, and also a corresponding guide for the conveyor guide groove 11. FIG. 10 shows a section of a sectioned central body 5 and half of a multiple-part end element 56 placed thereon.

Figure 11:
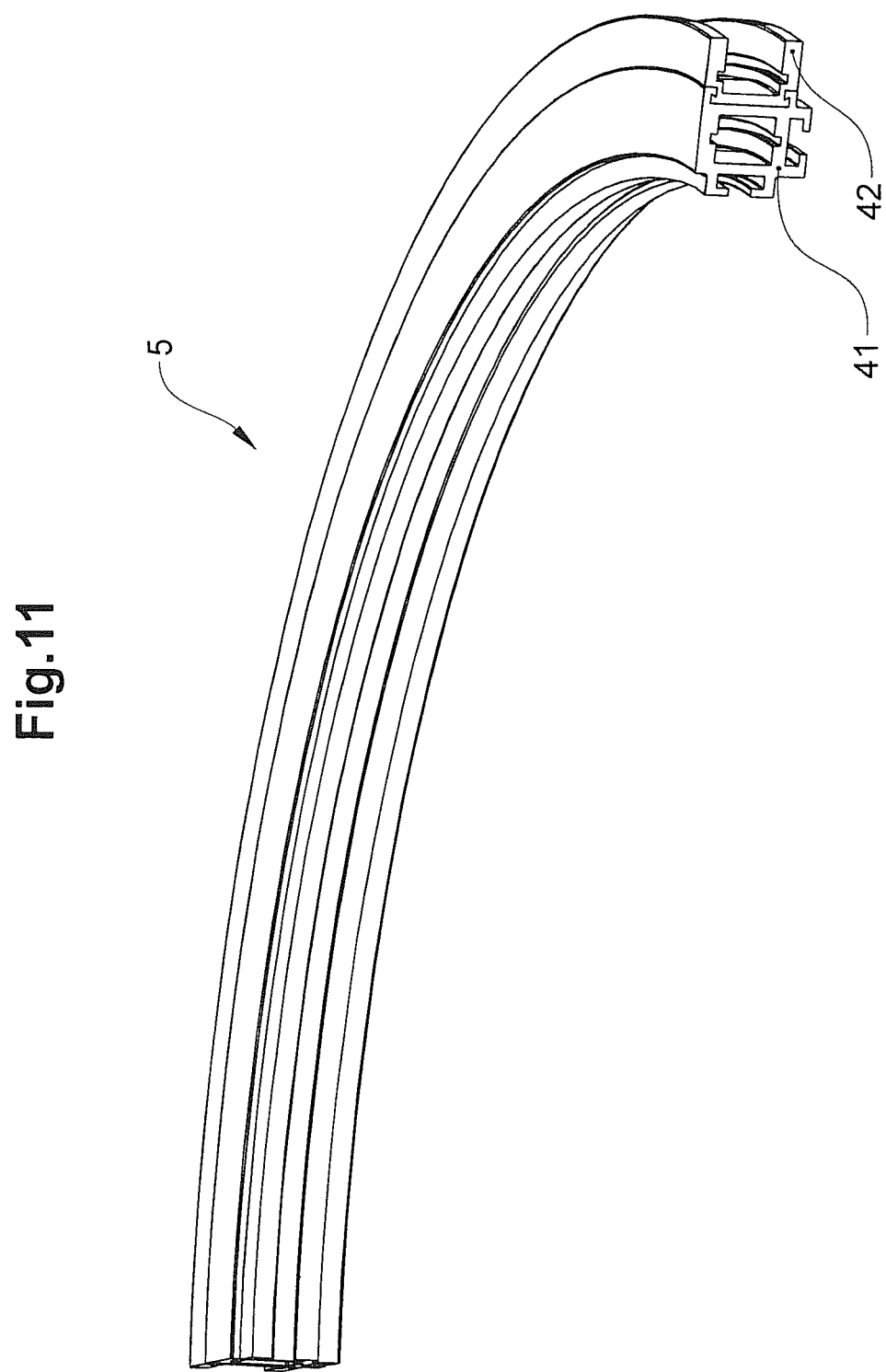

To produce a curved and/or twisted deflecting device 1, the first and second part profiles 41, 42, which are present in a straight form, are pushed into each other or snapped into each other by interlocking the connecting profiles. A certain displaceability of the connecting profiles toward each other in the longitudinal direction is maintained. The part profiles 41, 42, connected in such a manner to form a initial profile, are then together brought into a desired form, i.e. bent and/or twisted. FIG. 11 shows a profile from two part profiles which have been bent in such a manner. In this case, during bending, the part profiles 41, 42 can be displaced to a limited extent toward each other in the longitudinal direction. During said deforming, at least one of the part profiles 41, 42 is preferably plastically deformed. For example, in this case, one of the part profiles is of metal, or even both of them. As a result, after deforming, even the central body 5 as a whole retains its new form. On account of the different radii, after bending the central body 5, it is necessary to cut the central body 5 to length such that said central body comprises a straight closure. The end elements 56 are then placed at the two ends of the central body 5 and connected. The roller body 2 can be inserted prior to this or after this, for example by threading it along the conveyor guide groove 11 and connecting both ends of the roller belt 4.

Figure 12:
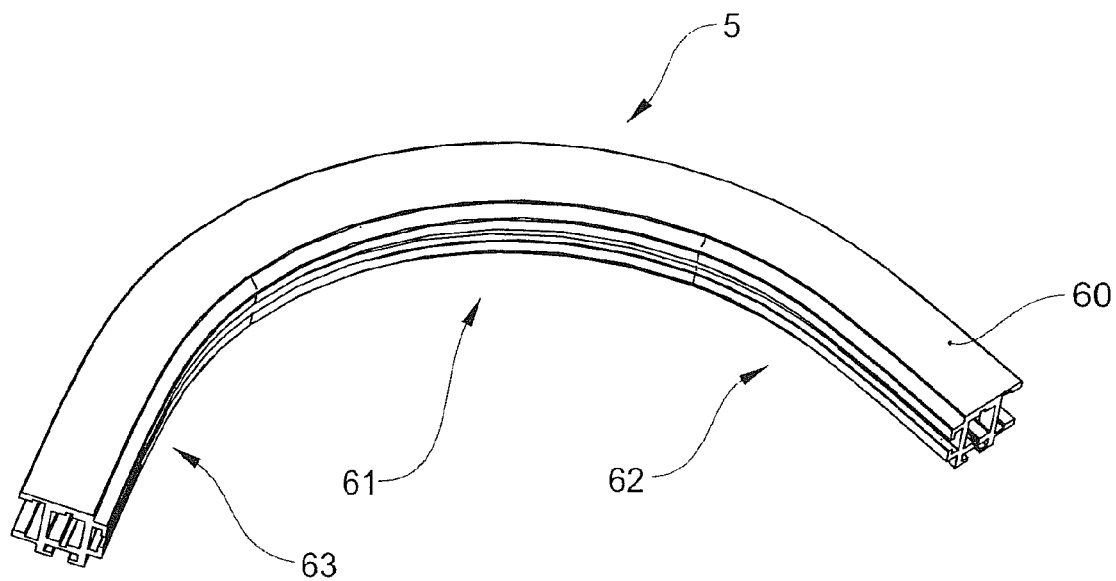
FIG. 12 shows a schematic representation of a deflecting device with a varying radius.

FIG. 12 shows a central body 5 with a profile 60 with a varying curvature. Said profile therefore comprises a first region 61 with a constant curvature, and transition regions 62, 63 which connect thereto on both sides and depending on the direction of conveying, can also be seen as inlet region and outlet region. In said transition regions 62, 63, the curvature continuously increases, when seen from the outside, from zero until the curvature of the first region is achieved. As a result, a jolt-free deflection of the conveying means 23 and consequently also of the conveyed product is possible. The form of the transition regions 62, 63 is preferably a clothoid.

The central body 5 is formed here additionally in an exemplary manner from one single profile. Such profiles with varying curvature also with central bodies 5 can naturally be produced from several part profiles.

Figure 13:
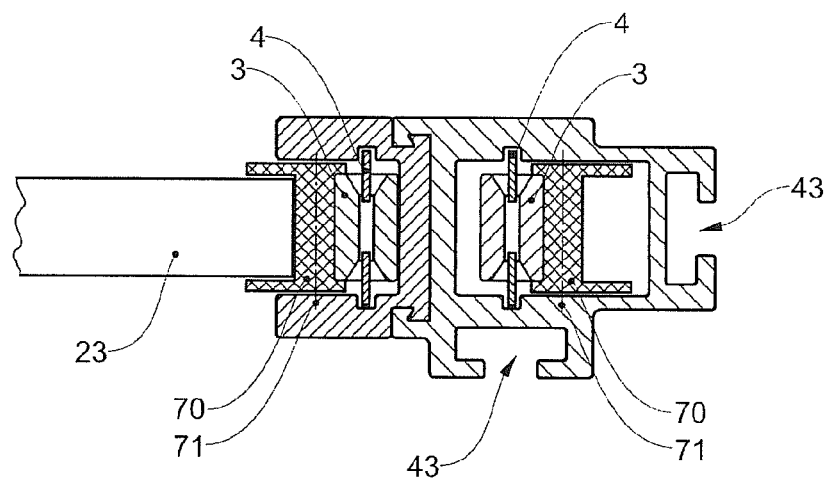
FIG. 13 shows a schematic representation of a deflecting device with a circulating protecting means as an adapting element.

FIG. 13 shows a cross section similar to that of FIG. 9, but additionally with an adapting element 70 with chained elements which also circulate around the central body 5 outside the roller body 2 and, at the same time, at least along the front conveyor track where the conveying means 23 is supported, roll on the rollers 3. The chained elements of the adapting element 70 are rotatable toward each other about pivot joints with axes 71. In another preferred embodiment of the invention, the adapting element 70 is a flexible belt. The adapting element 70 is formed corresponding to the form of the conveying means 23 in the edge region of the conveying means 23.

In a further embodiment, the adapting element 70 comprises a first toothing 31, into which a corresponding second toothing 32 of the conveying means 23 engages. This is analogous to the toothing of the drive belt 28 in FIG. 15 which is explained below.

The adapting element 70 also operates as protection for the rollers 3 from contamination. An adapting element can also be used purely as a protecting means, and in this case does not have to be matched in particular to the form of the conveying means 23.

Figure 14:
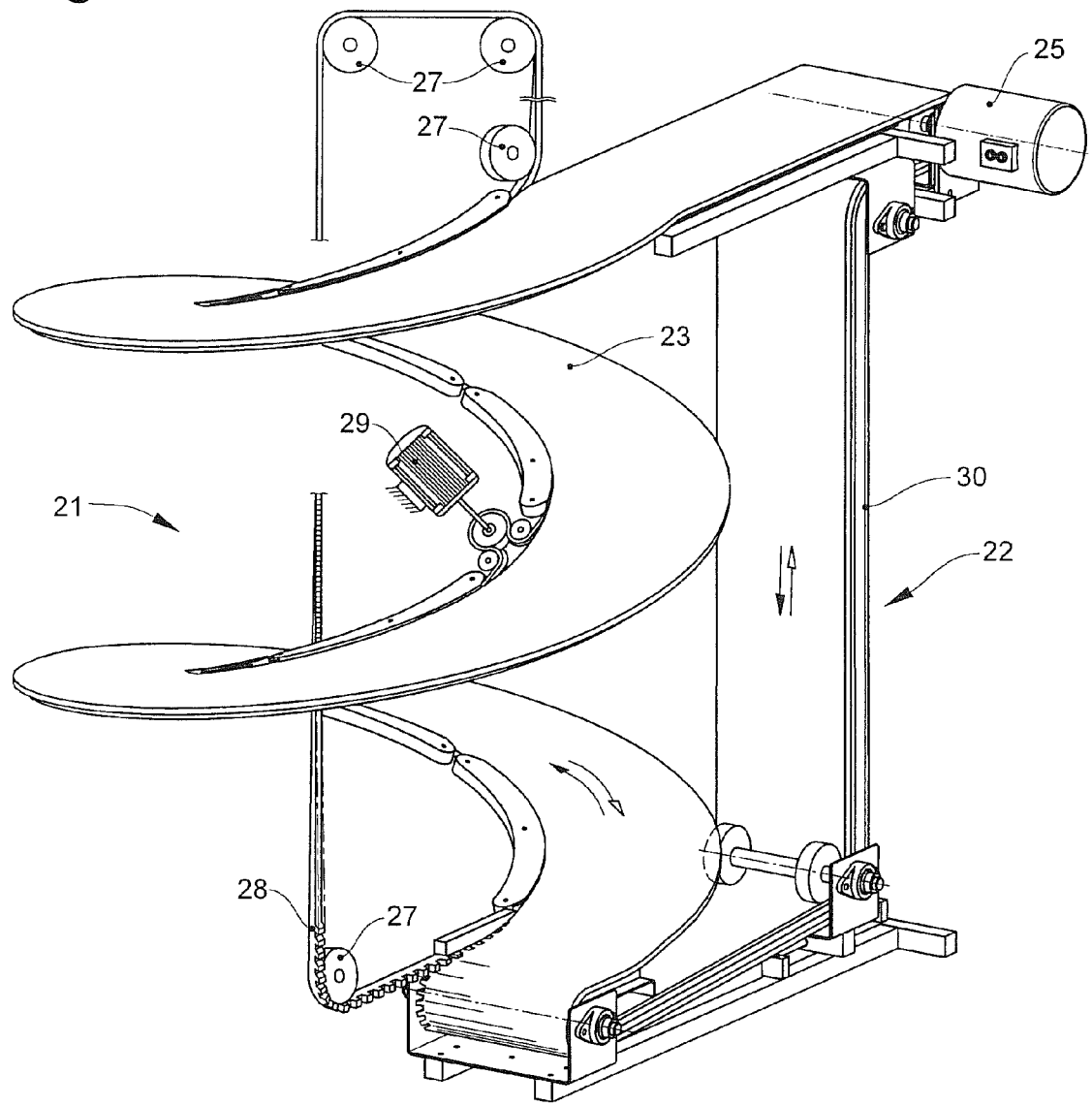
FIG. 14 shows a schematic representation of a spiral conveyor with a drive belt which extends along the spiral as an adapting element.

FIG. 14 shows a spiral conveyor with a drive belt 28 extending along the spiral as an adapting element. The drive belt 28 extends along the inside of the conveying means 23 and transmits a driving force to the conveying means 23. This can occur purely by means of frictional engagement by the drive belt 28 being flat or not being profiled in the direction perpendicular to the conveying direction, or by positive locking, for example by means of toothing, as shown in the following two figures. In the region of the spiral, more precisely in a region in which the drive belt 28 follows the helical line of the spiral, the drive belt 28 is supported in the radial direction by the deflecting devices 1. In regions outside the spiral or rather the helical line of the spiral, the drive belt 28 is guided back preferably by means of guide rollers 27, for example parallel to the axis of the spiral.

At one or at several positions, the drive belt 28 can be driven by a belt drive 29 or, expressed more generally, a device for introducing force. To this end, the drive belt 28 can be guided away from the spiral at this position and can be guided around a drive wheel of the device for introducing force. Force can be introduced well by the drive belt 28 wrapping around the drive wheel. It is possible, if there are several devices for introducing force, for them to be driven in each case individually by their own motor, or for several of them to be driven by a common motor by means of a drive shaft or drive chain.

Figure 15:
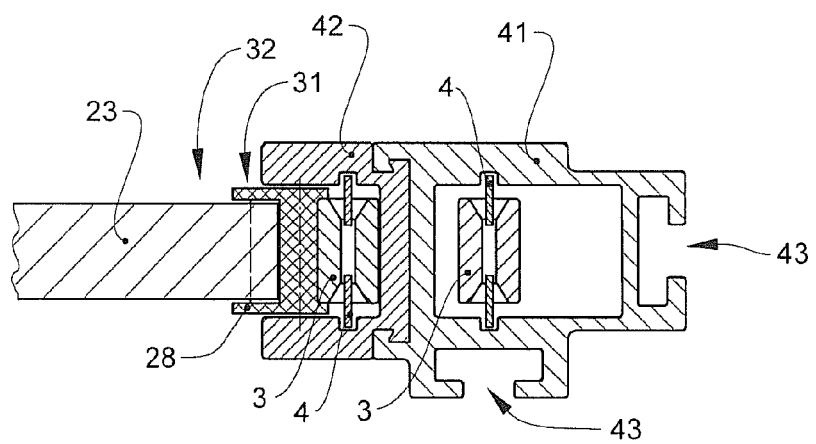
FIG. 15 shows a schematic representation of a cross section through a guide profile of the same.
Figure 16:
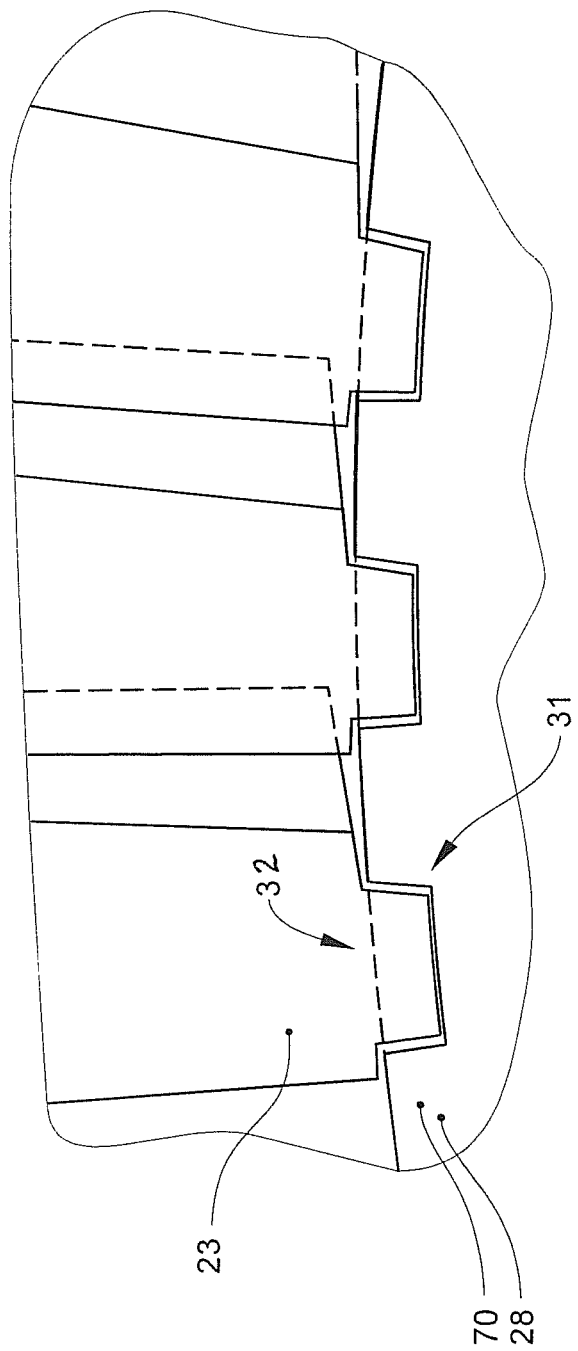
FIG. 16 shows a schematic representation of a toothing of the drive belt and elements of the conveying means.

FIG. 15 shows a cross section through a guide profile 41, 42 of the conveyor in FIG. 14. FIG. 16 shows a toothing of the drive belt with individual elements of the conveying means 23. If toothing is present and consecutive elements of the conveying means 23 engage in the first toothing 31, a distance between said elements is consequently determined. In the region of the spiral, elements of the conveying means 23, which lie parallel to each other in the straight sections, can be rotated toward each other at an angle, that is to say can be rotated toward one another in the manner of a fan. The angle between the elements corresponds to the distance of the first toothing 31 such that a uniform introduction of force, distributed over the inner circumference of the spiral, takes place. In addition, the toothing prevents a fanning out of the elements inserted into each other brought about by a tensile force which acts on the conveying means 23, in particular the tensile force of the drive 25. However, as a rule, the drive belt 28 is not engaged with the conveying means 23 in the straight regions of the conveying means 23 because there, on account of the other rotation of the elements toward each other, the first toothing 31 and the second toothing 32 do not correspond with each other.

If there is toothing present, the same first toothing 31 can wrap around the drive wheel and at the same time engage in a corresponding toothing of the drive wheel for transmitting the force. As claimed in another embodiment, there is a further toothing present on the drive wheel 28, said further toothing not being identical to the first toothing 31, and the drive wheel engages in said further toothing or several drive wheels engage in said further toothing. For example, the further toothing is arranged on one or several further sides of the drive belt 28.

In place of a drive wheel, a differently developed element for introducing the force into the drive belt 28 can be present in all of the embodiments, for example a belt or a chain or a cam chain, etc.

Lateral walls (lying above and below the conveying means in FIG. 15) of the first toothings 31 can be present and form a conveying means guide. It is also possible for no lateral walls to be present such that the conveying means 23 are guided in the direction perpendicular to the conveying surface by the second part profiles 42.

Figure 17:
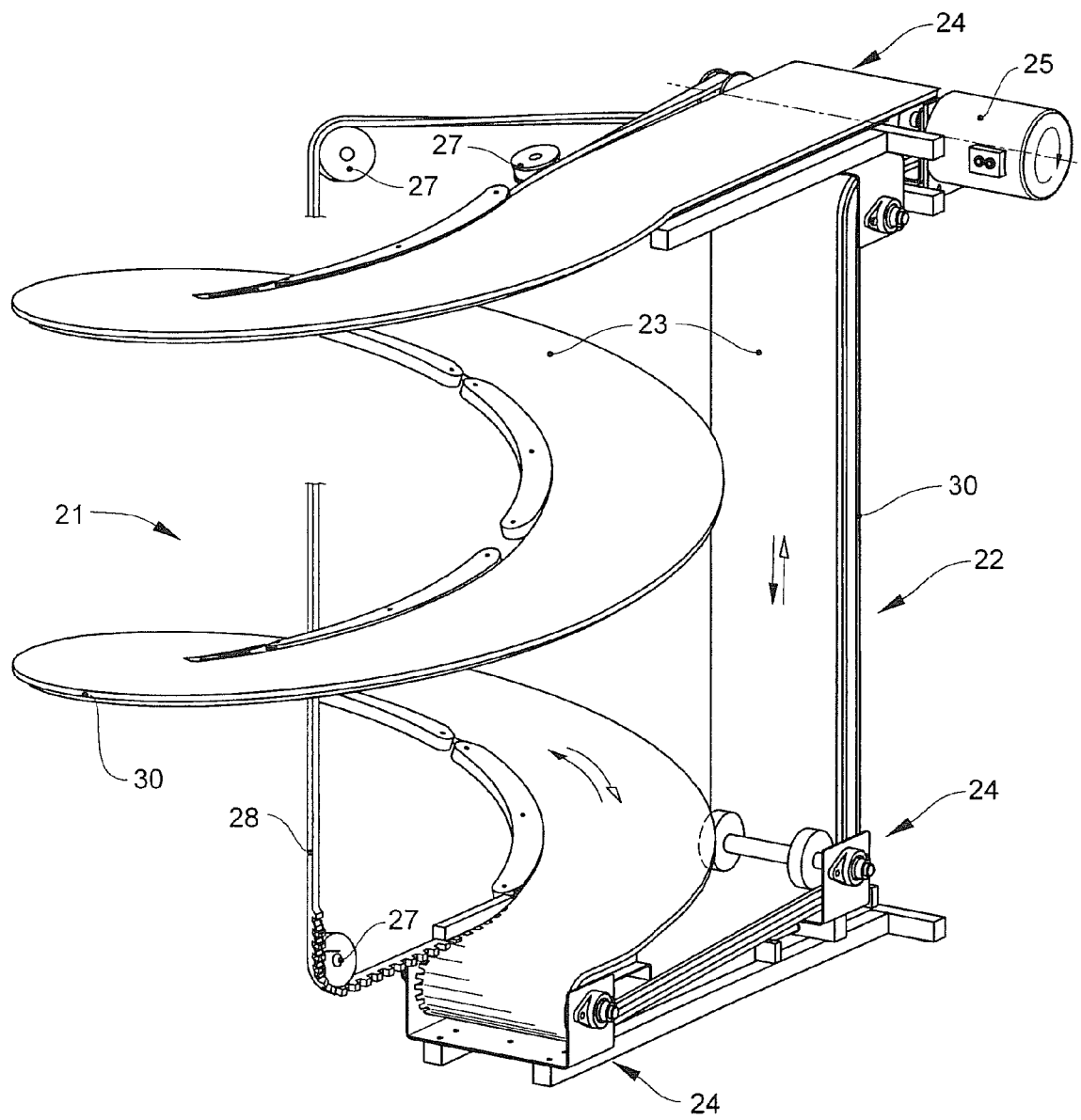
FIG. 17 shows a schematic representation of a variant of the spiral conveyor with a drive belt.

FIG. 17 shows a variant of the spiral conveyor with a drive belt 28. Contrary to the embodiment in FIG. 14, the drive belt 28 is not (or not only) driven by the belt drive 29, but (also) by the drive 25 which acts directly on the conveying means 23 or the flush-grid chain. On account of the above-mentioned displacement of the elements of the conveying means 23, the drive belt 28 is guided in a substantially parallel manner with respect to the conveying means 23 in the straight regions, but at a spacing and not in engagement with the same. A guide profile can be realized as in FIG. 15.

Figure 18:
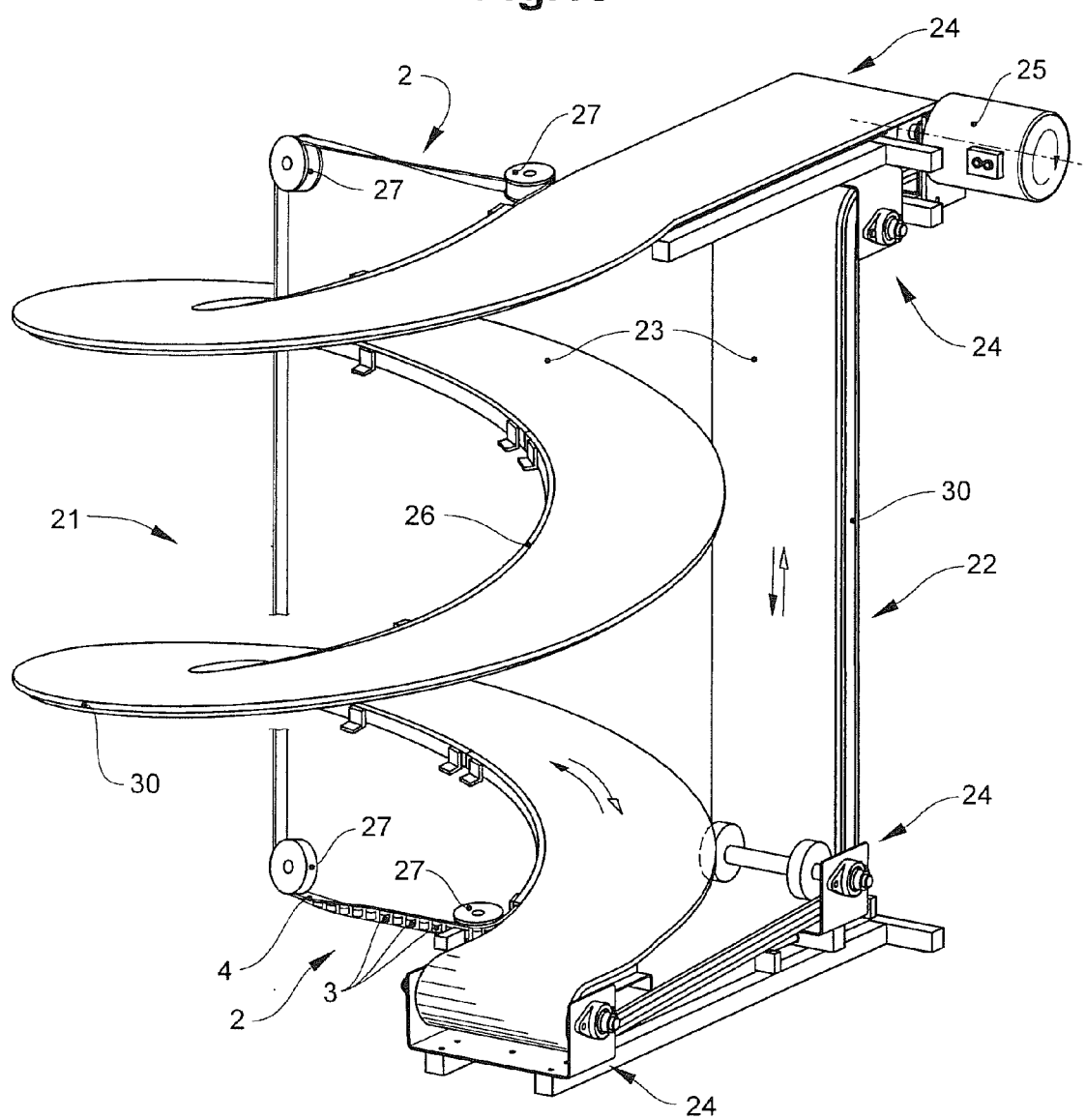
FIG. 18 shows a schematic representation of a spiral conveyor with a roller body extending along the spiral.

FIG. 18 shows a spiral conveyor with a roller belt 4 extending along the spiral without any individual deflecting devices. In their place is a guide rail 26 which extends along the inside of the spiral. The roller body 2, held together by the roller belt 4, therefore extends along the entire spiral or at least a longer section of the spiral (for example about 360° or more) on the inside of the spiral and there, in a rolling manner, supports the conveying means 23 or the adapting element 70 or rather the drive belt 28 in the radial direction. The return of the roller body 2 after circulation around the spiral is preferably effected by means of guide rollers 27, for example parallel to the axis of the spiral. Otherwise, the roller body as such has the same design and the same function as described in conjunction with FIGS. 2 and 3.

Figure 19:
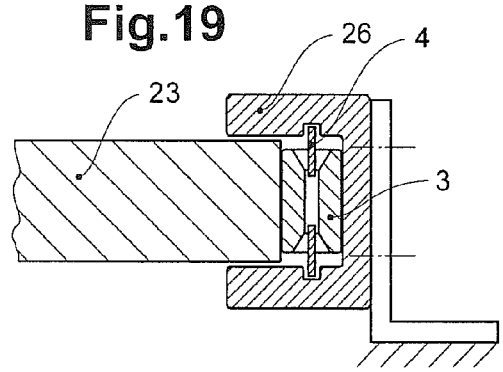
FIG. 19 shows a schematic representation of a cross section through a guide rail of the same.

FIG. 19 shows a cross section through a guide rail 26 of the same. As the return does not occur along the spiral, there can be a relatively simple C-profile present which can be bent or formed over the entire spiral, i.e. along the inner helical line of the spiral, or along a longer section of the same. The C-profile can be multi-part by being assembled along its longitudinal direction from several part profiles in rows next to each other. The C-profile can also be assembled in cross section from several elements.

The embodiments with a roller body 2 extending along the spiral can be combined with the embodiments with a drive belt 28 extending along the spiral. The guide profile, in this case, looks as in FIG. 15, but without the returning roller belt 4 on the right-hand side; or, in other words, as in FIG. 19 but additionally with the drive belt 28 between the roller belt 4 and the conveying means 23.

In further embodiments, the roller belt 4 and/or the drive belt 28 are each guided only in sections along the spiral, the spiral comprising several such sections. For example, such a section goes round 360° in each case or a multiple thereof and in each case comprises a roller belt 4, a drive belt 28 and a belt drive 29, and two or more such sections are arranged one behind another in a modular manner.

LIST OF REFERENCES

1 Deflecting device
2 Roller body
3 Roller
4 Roller belt
5 Central body
6 Recess
7 Bearing projection
8 Indentation
9 Tensioning body
10,10' Conveyor guide body
11 Conveyor guide groove
12 Support
13 Roller track
14 Front roller track
15 Return roller track
16 Return roller guide
20 Spiral conveyor
21 Spiral region
22 Return region
23 Conveying means, flush-grid chain
24 Vertical deflections
25 Drive
26 Guide rail
27 Guide roller
28 Drive belt
29 Belt drive
30 Slide rail
31 First toothing
32 Second toothing
41 First part profile
42 Second part profile
43 Fastening profile
44 Connecting profile
45 Complementary connecting profile
46 Conveying means guide
51 Inner track element
52 Outer track element
53 Spacer element
54 Top body
55 Bottom body
56 End element
60 Central body with varying curvature
61 Region with constant curvature
62,63 Transition region
70 Adapting element
71 Pivot joint axis

The invention claimed is:

1. A spiral conveyor, comprising:
a conveying means moved along a helically extending spiral region,
wherein a radially loaded side of the conveying means along the spiral region is supported by a plurality of individual deflecting devices that are disposed along the radially loaded side of the conveying means, and
wherein said deflecting devices each comprise a twisted central body with a roller body circulating around said central body with a plurality of rollers, and the rollers roll along a roller track of the central body in an angular segment of the helically extending support region.

2. The spiral conveyor as claimed in claim 1, further comprising a drive means that extends along the spiral region and between the conveying means and the roller body and that transmits a driving force to the conveying means.

3. The spiral conveyor as claimed in claim 2, wherein the drive means comprises a first toothing that engages into a second toothing of the conveying means in the spiral region and, as a result, transmits the driving force.

4. The spiral conveyor as claimed in claim 2, wherein the drive means is driven by a device for introducing force at at least one position along the spiral region.

5. The spiral conveyor as claimed in claim 1, wherein a circular path of the rollers about the central body is closed and comprises a varying curvature.

6. The spiral conveyor as claimed in claim 1, wherein the conveying means is selected from the group consisting of an elastic band, a flush-grid chain, link chain, plate chain and a flat-top chain.

7. The spiral conveyor as claimed in claim 1, comprising a plurality of non-twisted deflecting devices that are arranged one after the other following the course of the conveying means in a helical manner.

8. The spiral conveyor as claimed in claim 1, wherein the central body is elastic, is produced in a planar form and is mounted in the spiral conveyor in a twisted form.

9. A method for producing a spiral conveyor, said method comprising the steps of:
producing a central body for a deflecting device and inserting a roller body into the central body, wherein a track of the roller body around the central body lies in a plane,
assembling the deflecting device as a structural unit in the spiral conveyor, wherein the deflecting device, as it is being installed into the spiral conveyor of the assembly, is deformed by twisting.

10. A deflecting device comprising:
a central body with a roller body that circulates around the central body, and
the roller body comprises a plurality of rollers that roll around the central body on a roller track of the central body, wherein the central body comprises at least one profiled rod of metal, said central body is produced in a straight form and is then brought into a twisted form via plastic deformation.

11. The deflecting device as claimed in claim 10, wherein the central body or part of the central body comprising an inner and an outer track element along which the rollers are guided.

12. The deflecting device as claimed in claim 10, wherein the central body comprises at least two part profiles in the deformed state, and comprises a profile cross section that remains substantially the same along a longitudinal direction of the central body.

13. The deflecting device as claimed in claim 10, comprising a first region with a constant curvature and transition regions that connect to said first region on both sides, wherein in each case, when seen from the ends of the deflecting device, the curvature of the deflecting device in the transition regions increases constantly from zero as far as up to the curvature of the first region.

14. The deflecting device as claimed in claim 10, comprising a protecting means that circulates around the central body outside of the roller body and which, in the region of a front roller track where a conveying means is supported, extends between the conveying means and the rollers.

15. The deflecting device as claimed in claim 14, wherein the protecting means is an adapting element that, in the region in which the protecting means abuts against the conveying means, has a shape that corresponds to a shape of the conveying means.

16. A method for producing a deflecting device, said method comprising the steps of:
  producing an initial profile that comprises a profile cross section that is substantially unchanged along a longitudinal direction of the initial profile;
  plastically deforming the initial profile into a twisted form; and
  inserting rollers and assembling end elements for guiding the rollers.

17. The method as claimed in claim 16, wherein producing of the initial profile occurs by connecting together at least two part profiles with or without further parts as connecting means.

* * * * *